United States Patent
Mann et al.

(10) Patent No.: US 9,540,927 B2
(45) Date of Patent: Jan. 10, 2017

(54) HIGH RESOLUTION CONTINUOUS DEPTH POSITIONING IN A WELL BORE USING PERSISTENT CASING PROPERTIES

(71) Applicant: Micro-g LaCoste, Inc., Lafayette, CO (US)

(72) Inventors: Ethan H. Mann, Broomfield, CO (US); Andrew James Black, Broomfield, CO (US); Aaron J. Schiel, Brighton, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 440 days.

(21) Appl. No.: 14/245,176

(22) Filed: Apr. 4, 2014

(65) Prior Publication Data

US 2015/0285069 A1   Oct. 8, 2015

(51) Int. Cl.
| | | |
|---|---|---|
| *E21B 49/00* | (2006.01) | |
| *E21B 47/04* | (2012.01) | |
| *E21B 47/09* | (2012.01) | |
| *G01V 3/18* | (2006.01) | |

(52) U.S. Cl.
CPC .............. *E21B 49/00* (2013.01); *E21B 47/04* (2013.01); *E21B 47/0905* (2013.01); *G01V 3/18* (2013.01)

(58) Field of Classification Search
CPC ...... E21B 49/00; E21B 47/04; E21B 47/0905; G01V 3/18; G01V 3/11
USPC ...................................................... 166/255.1
See application file for complete search history.

(56) References Cited

U.S. PATENT DOCUMENTS

| | | | |
|---|---|---|---|
| 2,967,994 A | | 1/1961 | Peterson |
| 3,396,787 A | * | 8/1968 | Vann ....................... E21B 47/04 166/255.1 |
| 4,808,925 A | | 2/1989 | Baird |
| 5,720,345 A | | 2/1998 | Price et al. |
| 6,084,403 A | | 7/2000 | Sinclair et al. |
| 6,768,299 B2 | | 7/2004 | Almaguer |
| 7,283,061 B1 | * | 10/2007 | Snider ................... E21B 17/006 166/254.2 |
| 7,363,967 B2 | | 4/2008 | Burris et al. |
| 7,622,916 B2 | | 11/2009 | Meeten et al. |
| 7,784,564 B2 | | 8/2010 | Iskander et al. |
| 2011/0290011 A1 | | 12/2011 | Dowla et al. |
| 2014/0152298 A1 | * | 6/2014 | Hallunbæk ......... E21B 47/0905 324/207.13 |
| 2016/0053608 A1 | * | 2/2016 | Dowla .................... E21B 17/08 166/254.2 |

FOREIGN PATENT DOCUMENTS

EP      0697497 A1    2/1996

OTHER PUBLICATIONS

PCT International Search Report with attached Written Opinion of the International Searching Authority for International Application No. PCT/US2015/023894, dated Jul. 7, 2015, 8 pages.

* cited by examiner

*Primary Examiner* — Michael Wills, III
(74) *Attorney, Agent, or Firm* — John R. Ley

(57) ABSTRACT

Continuous measurement indicia between casing collars of a pipe segment of a well bore casing is obtained from signals obtained by sensing innate, persistent and unaltered characteristics, e.g. magnetic permeability, of the pipe segment along its length, and using the signals to perform a downhole function, e.g. a gravity measurement, at an indicated location.

32 Claims, 9 Drawing Sheets

HIGH RESOLUTION CONTINUOUS DEPTH POSITIONING IN A WELL BORE USING PERSISTENT CASING PROPERTIES

This invention relates to determining precise depth positions in a cased well bore used to produce hydrocarbons in the oil and gas industry, to produce water, to monitor subsurface conditions, for mining, for geotechnical purposes and for engineering, among others. More particularly, the invention relates to accurately establishing downhole positions at locations between casing collars where segments of pipe have been connected to form the casing. Further still, the invention relates to performing downhole functions, such as gravity surveys, on a repetitive basis at the same downhole positions despite significant lapses of time between performing the downhole functions and despite the use of different equipment to measure the downhole position.

BACKGROUND OF THE INVENTION

The depth of a downhole tool in the well bore is typically determined by measuring the length of a suspension cable attached to the tool that has been lowered into the well bore. This depth measurement is made by an encoder or odometer which measures the amount of cable that has been paid out from a winch into the well bore. Unfortunately, the odometer measurement does not accurately reflect the downhole location of the tools or whether the tool is actually moving within the well bore. The odometer measurement contains errors which result from stretching of the cable between the winch and the downhole tool. Cable stretch is affected by many factors including the type of cable used to suspend the tool, the tool weight, the tension in cable, cable friction, hole rugosity, deviation of the hole, temperature in the well, speed of movement and changes in speed of the cable, and variations in cable tension caused by the friction between the cable and the casing and between the tool and the casing, as well as other factors. Compensation for some of these factors can be made, but not for all of these factors. As a consequence, the measurement from the odometer is not a reliable indication of the depth of the tool within the well bore.

The traditional technique of augmenting the odometer measurement is using casing collar location information obtained from a casing collar locator carried by the downhole tool. The casing collar locator magnetically senses the position of casing collars where connected segments of pipe are threaded together to form the casing. A casing collar is an enlarged diameter end portion of one pipe segment which is internally threaded and which receives the external threats at the end of the adjoining connected pipe segment. The larger diameter of the casing collar and the possibility of a slight gap between the adjoining ends of the connected pipe segments creates a distinctive change in the magnetic permeability of the metal (typically steel) casing at each collar. The change in magnetic permeability is detected by signals from the casing collar locator when the downhole tool moves past the casing collar. The casing collar signals are communicated to the surface and coordinated with the odometer information to form a log or record of the odometer-measured depth of the casing collar locations.

Because the casing collar signals reliably identify the location of each casing collar, and because each pipe segment of the casing has a definite length, typically 30 or 40 feet, reasonably reliable indications of the depth of the downhole tool are established at intervals of 30 or 40 feet by the casing collar signals, despite inaccuracies of the odometer measurement. The locations of the casing collars are fixed relative to the surrounding earth formation as a result of cementing the casing into the borehole drilled into the earth formation.

The principal record of depth information for a well is called a "base cased hole log." All downhole functions are performed relative to the depth reference shown on the base cased hole log. The base cased hole log includes depth information derived from the casing collar signals, and information derived from two natural gamma ray surveys, one taken in the open borehole before the casing is inserted and the other taken after the casing has been cemented in place. The rocks and natural geological structures surrounding the borehole emit different intensities of natural radiation at different depths, and a gamma ray detector of a downhole tool detects the variation in gamma ray radiation relative to the odometer-measured depth. The resolution of a natural gamma ray survey is in the neighborhood of 0.5-1.0 feet. The open borehole natural gamma ray survey is sometimes accompanied by other types of surveys which log other formation parameters. The base cased hole log is created by correlating the natural gamma ray survey intensity information, the casing collar location information, the number and length of the pipe segments which form the casing, and any other open borehole survey information. The base cased hole log thereafter serves as the master depth reference log or base tie log for the well.

The depth information of the base cased hole log may not be precisely accurate, but that information nevertheless is used as the controlling reference for all subsequent depth measurements in the well bore. Certain downhole tools which are used for specialized purposes in a well bore are capable of providing high depth resolution. However, the use of such specialized downhole tools is an unusual event and the depth information from such tools is typically not used to create the base cased hole log or in subsequent downhole functions or activities.

Subsequent downhole functions or activities at predetermined depths require the depth information from the odometer to be correlated or tied in to the depth information of the base cased hole log. The most reliable interval depth information by which to correlate presently obtained odometer depth information to the depth information shown on the base cased hole log is casing collar location information. To obtain casing collar location information to achieve such correlation, a downhole tool that is used to perform the subsequent downhole function includes a casing collar locator. As the downhole tool moves past the casing collars, the casing collar locator sends casing collar signals to the earth surface where those signals are correlated to the odometer measured depth and to the base cased hole log.

If positioning is required between casing collar locations, the odometer must be relied upon to determine those intermediate positions. However, reliance on the odometer is prone to error even over intervals as short as 30 or 40 feet, particularly when the downhole tool must be stopped and started in its movement within the well bore. For example, the inventors are aware of the situation where the odometer indicated that approximately 15 feet of the suspension cable had been withdrawn from a 12,000 foot deep well bore, thereby presumably moving the downhole tool 15 feet, but in actuality the downhole tool had not moved from its previous position due to cable stretch and other anomalies. These types of errors are significant in well bore surveys that require exact placement of the downhole tool between casing collar locations.

For example, an accurate gravity survey requires positioning the gravity measurement instrument within the downhole tool at a position which is no more than about 1 or 2 cm different from the position of the gravity measurement instrument when an earlier reading of gravity was measured supposedly at that same location. Presently, the closest resolution available is within about 3 or 4 inches. A gravity survey is typically used to determine the extent of extraction of hydrocarbon products from an underground reservoir. As the reservoir is produced, the extracted gas or oil is displaced by water. A change in density of the reservoir occurs because the heavier density water has replaced the lighter density hydrocarbon products produced from the well bore. The change in density creates a change in gravity. Measuring the change in gravity requires two time-displaced or time-lapse gravity surveys. The difference of the earlier and later gravity measurements describes the extent of hydrocarbon production. The earlier and later gravity surveys may be separated by months or years; nevertheless it is very important to conduct the surveys at the same depth positions within the well bore to obtain reliable gravity information.

Using the casing collar signals to establish such a precise depth at the location between casing collars on a repeatable and time lapse basis is virtually impossible at the present time. The different types of suspension cables and odometers used in the later depth measurements contribute to the uncertainty. Starting and stopping the survey tool at positions between casing collars greatly multiplies the uncertainty. Consequently, many downhole functions, including well bore and gravity surveys, are not performed as accurately as desired, due to the practical inability to reliably and precisely measure the depth or distance between adjacent casing collars.

SUMMARY OF THE INVENTION

This invention involves using innate, persistent and unaltered magnetic or characteristic properties of pipe segments which form a casing of a well bore to establish reliable continuous indicia of distance between casing collar locations. Sensing the innate magnetic or characteristic properties generates unique position-related intermediate characteristic signals along the length of each pipe segment between casing collars. By logging the intermediate characteristic signals of each pipe segment between adjacent casing collar locations and coordinating those intermediate characteristic signals to the length of each pipe segment, continuous measurement indicia of the distance along each pipe segment between adjacent casing collar locations are obtained. The intermediate characteristic signals typically have sufficient resolution to allow a downhole position to be established reliably and accurately within a tolerance of 1-2 cm of a desired position.

Furthermore, it has been discovered that the innate magnetic or characteristic properties of the pipe segments which produce the intermediate characteristic signals persist over a relatively long time. The same characteristics properties are reliably sensed and used as downhole depth measurement indicia after a significant time lapse, for example months or years, thereby allowing a downhole tool to be positioned at precisely the same downhole location where a downhole function was previously performed, after a considerable lapse of time. While typical environmental effects such as rust and wear might slightly degrade the characteristic properties of the pipe segments, those properties remain sufficiently persistent to generate reliable intermediate characteristic signals for accurately establishing the same precise downhole location after a significant lapse of time. Rust and wear characteristics therefore do not alter sensed characteristic properties, as would any intentionally or naturally induced physical alterations in the casing.

The principal use of this invention is to conduct downhole functions at more accurate and repeatable depths, such as is necessary when conducting a gravity survey of the well bore, for example. The cost to perform such downhole functions will typically be reduced, because the time to position the downhole tool to perform the downhole functions is reduced. For example, gravity surveys typically require multiple measurements at the same attempted locations over a space of a few days for the purpose of attempting to average out positioning errors. The accuracy and positioning available from the present invention reduce the number of repeated measurements required or eliminates repeated measurements altogether because of the more accurate positioning available from sensing the characteristic properties of the pipe segments, thereby reducing the time to conduct the downhole function. A significant reduction in cost results from reducing the time of suspended production from the well while the downhole function is performed.

In accordance with these considerations, one basic aspect of the invention involves a method of deriving continuous measurement indicia between casing collars of at least one pipe segment of a casing in a well bore, by obtaining intermediate characteristic signals continuously along the length of the pipe segment between the casing collars from sensing innate, persistent and unaltered characteristic properties of the one pipe segment along its length between the casing collars, and using the intermediate characteristic signals as a measurement indicia. Another basic aspect of the invention involves using the intermediate characteristic signals as measurement indicia to position a downhole tool in the well bore at a desired location. A further basic aspect of the invention involves using the intermediate characteristic signals as measurement indicia to perform a downhole function at the desired location.

Subsidiary aspects of the invention involve, among other things: selecting a predetermined aspect of the intermediate characteristic signals which corresponds to the desired depth location and moving the downhole tool and performing the downhole function by reference to that selected predetermined aspect; moving the downhole tool while sensing the characteristic properties to obtain the intermediate characteristic signals which contain the predetermined aspect by which to reference the position of the moving downhole tool; correlating the predetermined aspect to the desired location described in a base cased hole log or a pre-existing well bore log describing the well bore; creating a continuous indicia depth measurement log from the intermediate characteristic signals; correlating depth locations of the continuous indicia depth measurement log to depth locations of the base cased hole log; using a computer executing software instructions to automatically correlate the depth locations of a previous and current log; performing a downhole function at the same predetermined location after a time lapse has occurred after performing an earlier downhole function at that same location, by using the predetermined aspect of the intermediate characteristic signals; and performing a plurality of gravity measurements at different spaced apart identical locations as each of the first and second downhole functions.

The aspects and features of the invention are described more specifically in the appended claims. A more complete appreciation of the invention and its scope, as well as the manner in which it obtains improvements and other benefits, can be gained by reference to the following detailed description of presently preferred embodiments and the accompanying drawings, which are briefly summarized below.

DETAILED DESCRIPTION OF THE DRAWINGS

Figure 3:
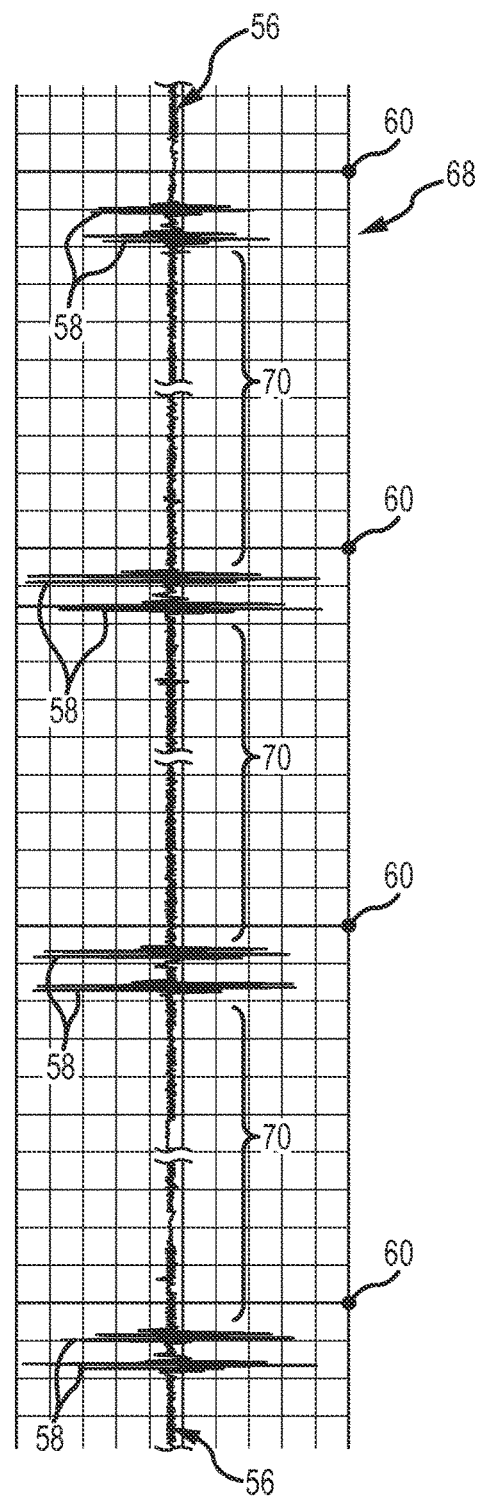
FIG. 3 is an illustration a continuous indicia depth measurement log formed by intermediate characteristic signals derived from sensing characteristic properties of pipe segments which form the casing shown in FIG. 2, and formed by casing collar signals. The signals shown in FIG. 3 correspond to the length or depth positions of the casing pipe segments shown in FIG. 2.
Figure 4:
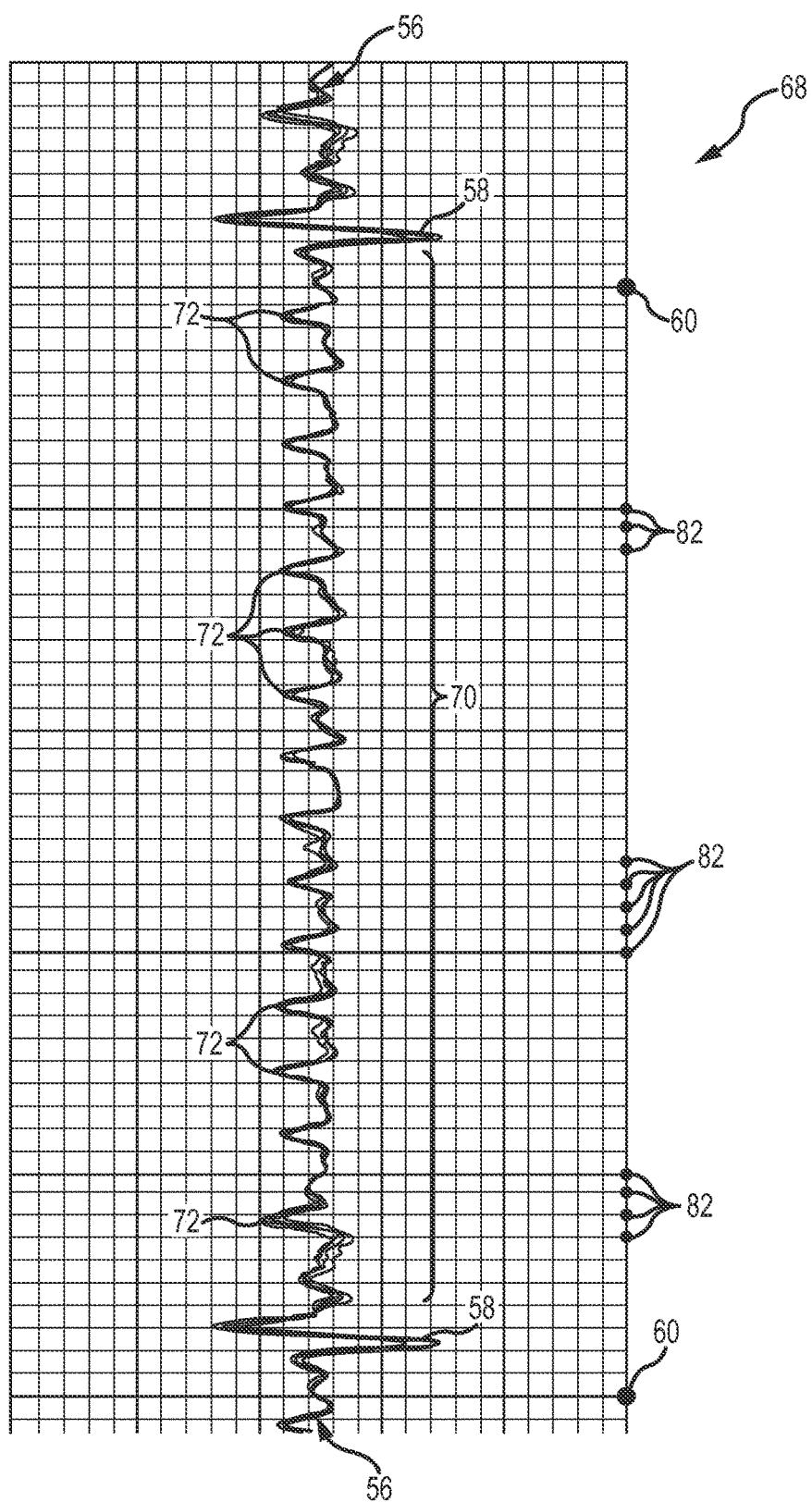

FIG. 4 is an enlarged view of a portion of the continuous indicia depth measurement log shown in FIG. 3, showing the intermediate characteristic signals obtained from sensing the characteristic properties of one complete pipe segment of the casing shown in FIG. 3, and further illustrating use of the intermediate characteristic signals as depth measurement indicia in accordance with the present invention.

Figure 1:
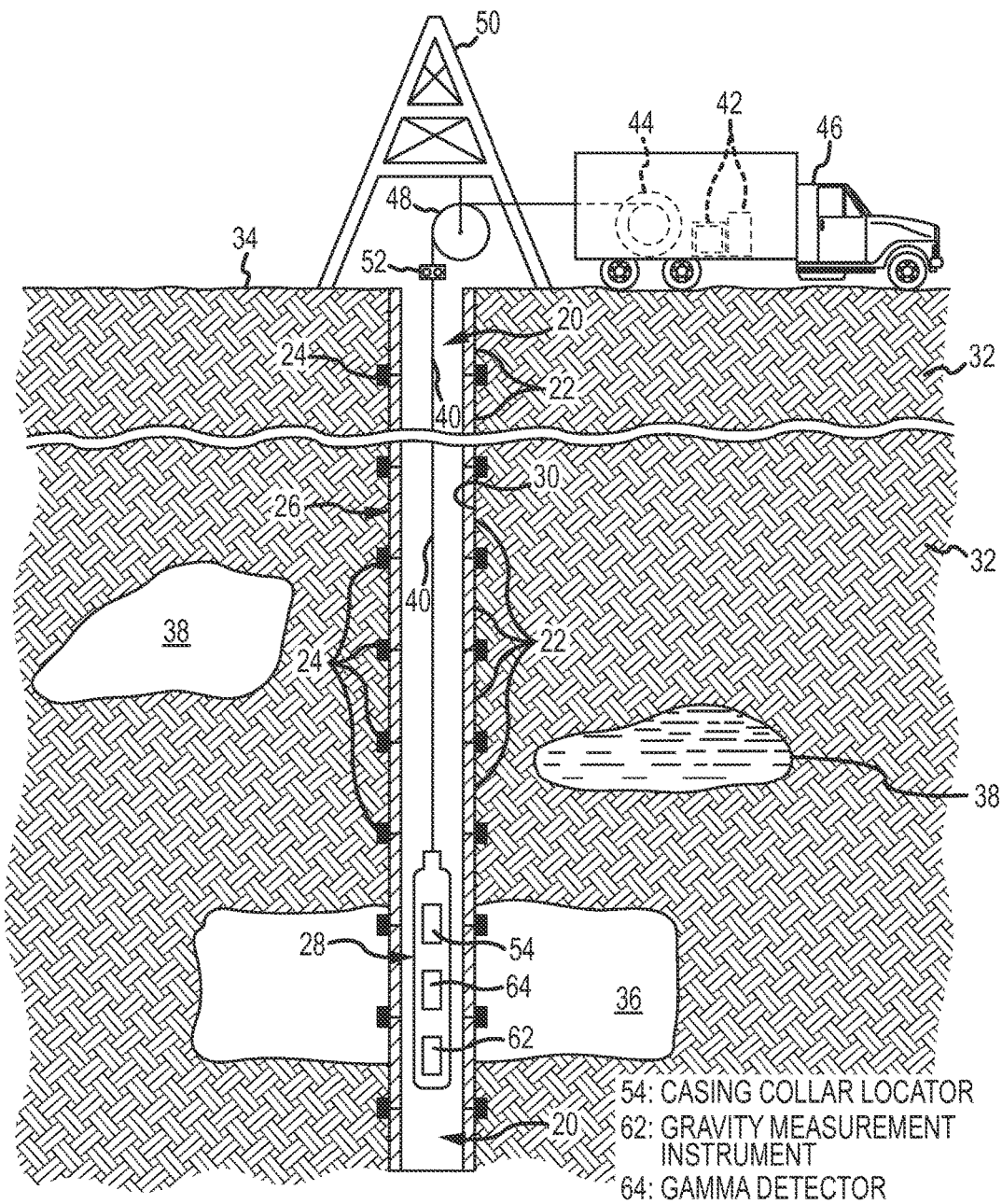
FIG. 1 is a schematic illustration of a well bore with a casing which penetrates a geological earth formation, including schematic illustrations of equipment used to obtain precise depth positions within the well bore and perform downhole functions, in accordance with the present invention.
Figure 2:
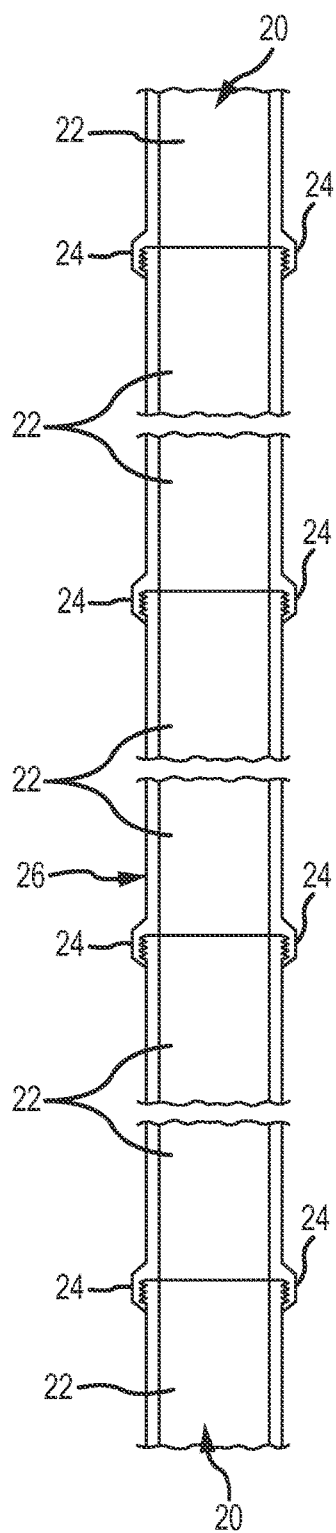
FIG. 2 is an enlarged view of a partial portion of the casing of the well bore shown in FIG. 1.
Figure 5:
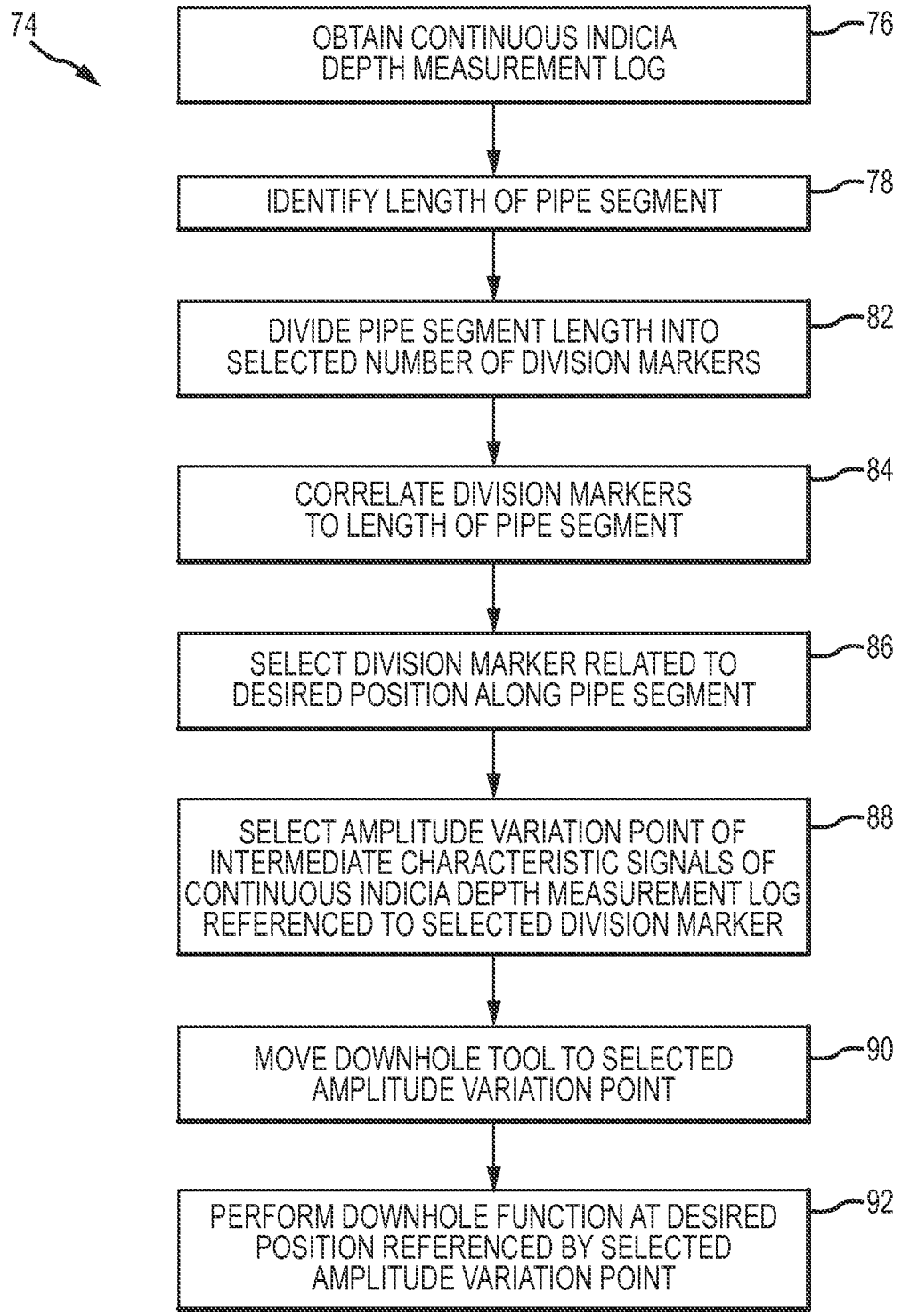

FIG. 5 is a flowchart of a process flow of obtaining precise measurement indicia along each pipe segment between each casing collar of the casing of the well bore shown in FIGS. 1 and 2, and of using the intermediate characteristic signals shown in FIG. 4 as indicia of a precise downhole position at which to perform a downhole function using a downhole tool in the well bore shown in FIG. 1.

Figure 6:
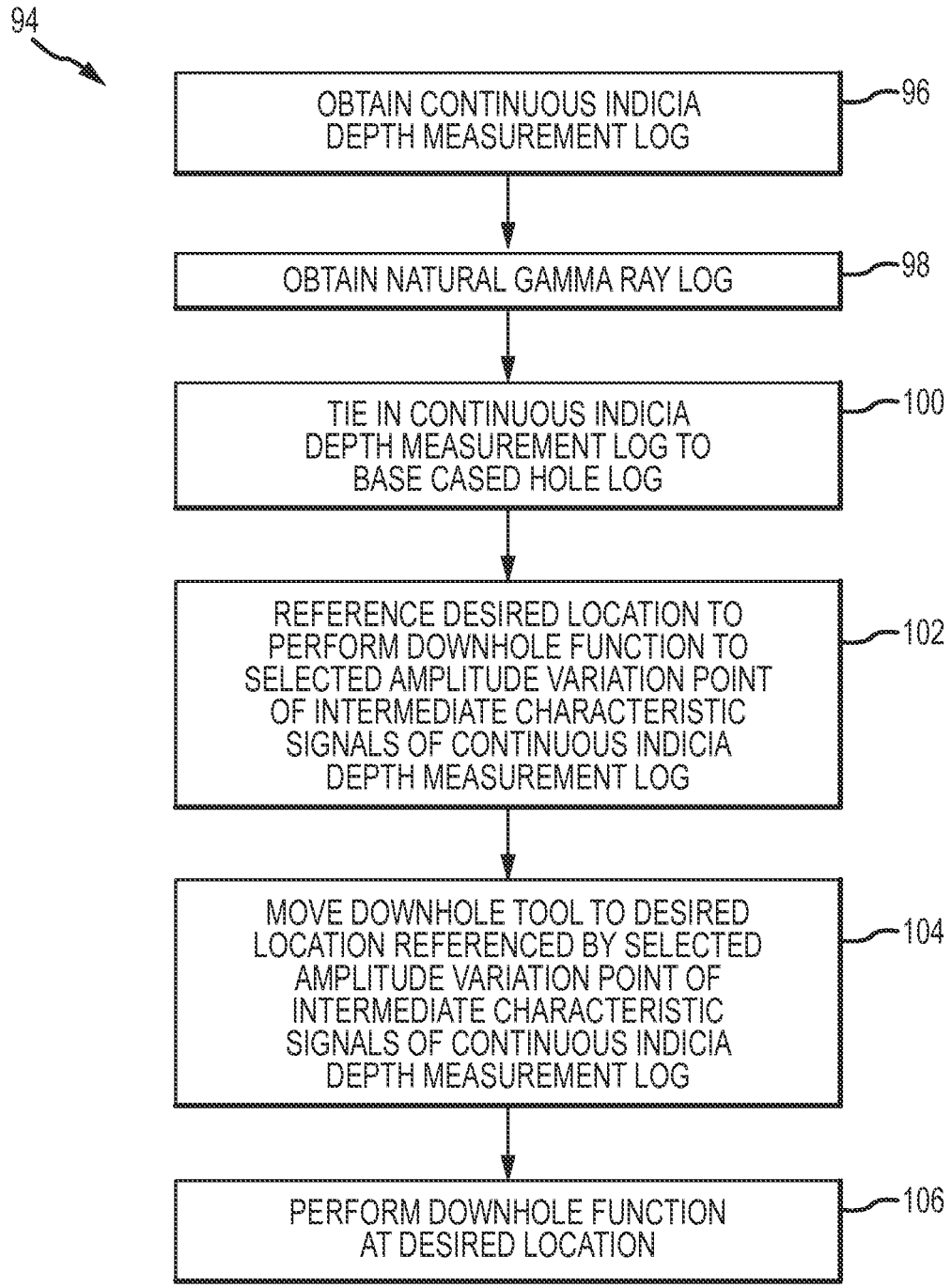

FIG. 6 is a flowchart of a process flow of correlating or tying in the continuous indicia depth measurement log shown in FIGS. 3 and 4 to a pre-existing base cased hole log, and of performing a downhole function at a desired downhole location established by an intermediate characteristic signal of the continuous indicia depth measurement log which has been tied in or correlated to the base cased hole log.

Figure 7:
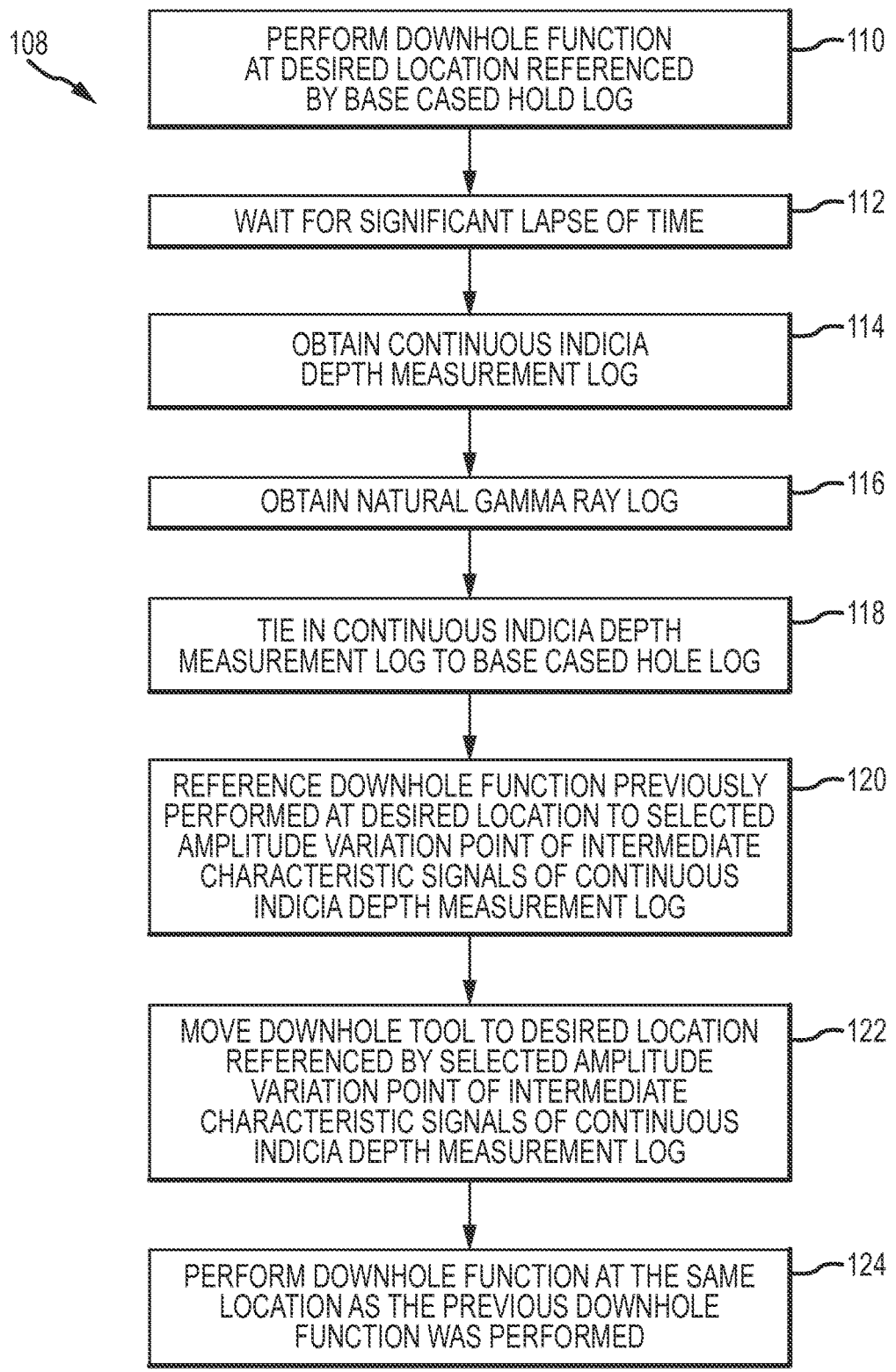

FIG. 7 is a flowchart of a process flow of performing a downhole function at a desired downhole location identified by a base cased hole log by obtaining and using the continuous indicia depth measurement log shown in FIGS. 3 and 4 after it has been tied in with the base cased hole log.

Figure 8:
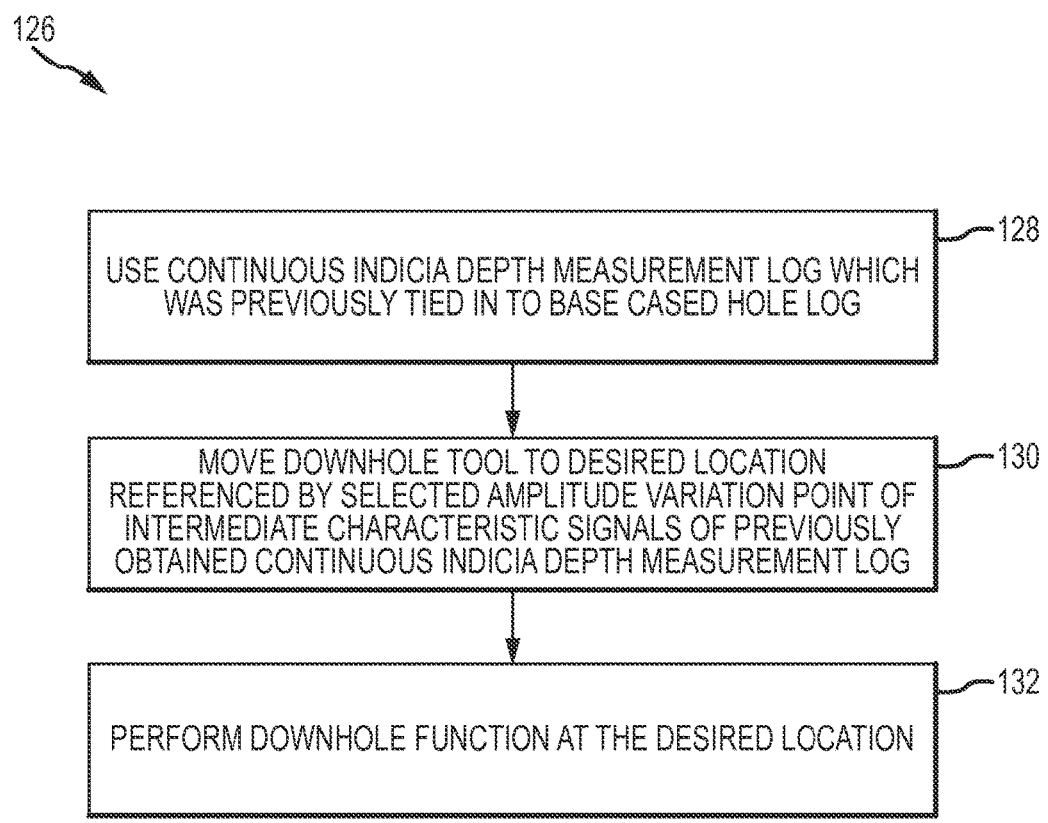

FIG. 8 is a flowchart of a process flow of performing a downhole function at a desired downhole location by using the intermediate characteristic signals of a currently-obtained continuous indicia depth measurement log and comparing those intermediate characteristic signals to the intermediate characteristic signals of a previously-obtained continuous indicia depth measurement log, with both continuous indicia depth measurement logs represented by the one shown in FIGS. 3 and 4.

Figure 9:
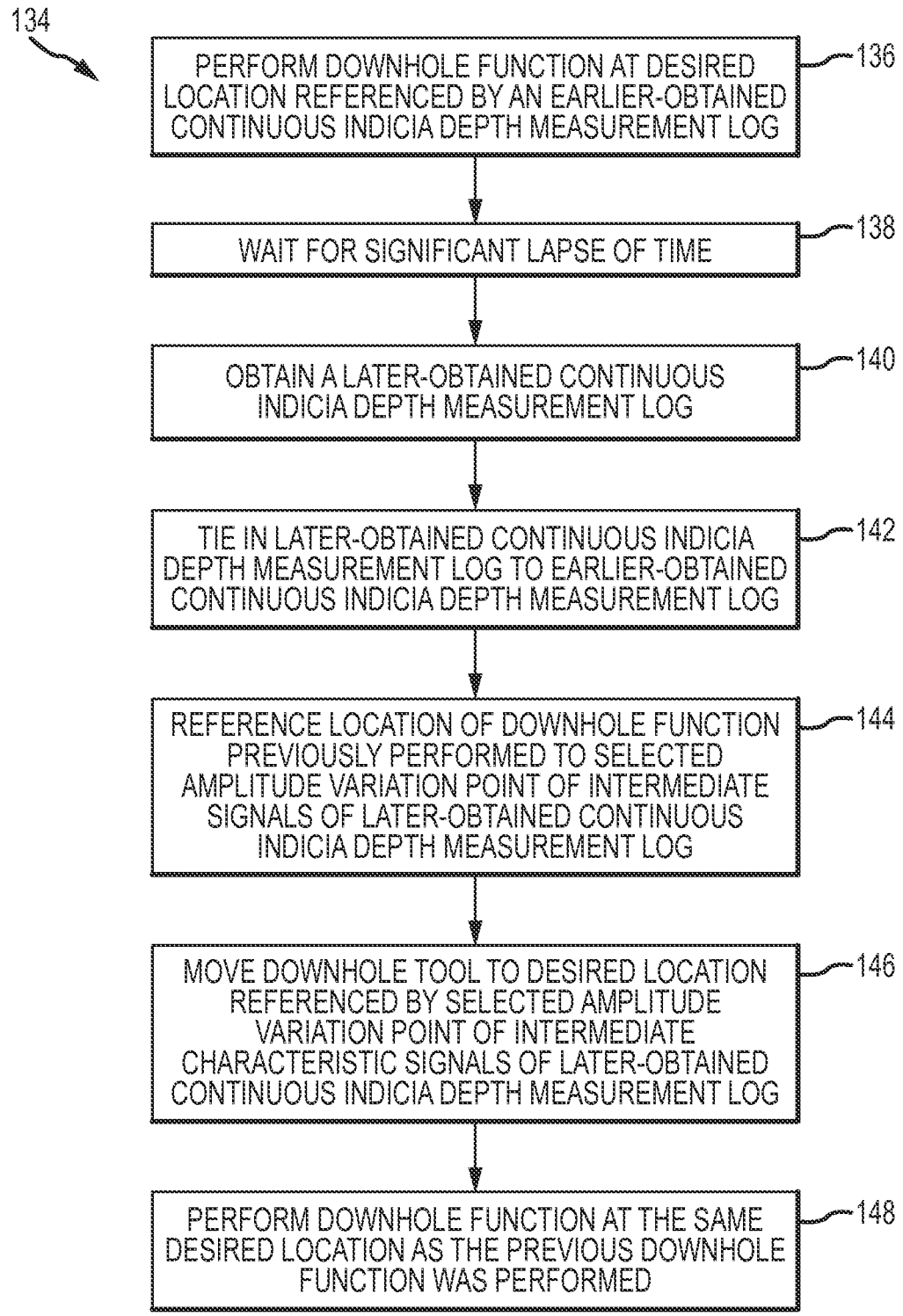

FIG. 9 is a flowchart of a process flow of performing a downhole function at a desired downhole location after a significant lapse of time by tying in or correlating an earlier-obtained continuous indicia depth measurement log to a previously-obtained continuous indicia depth measurement log to establish the position for performing the downhole function, with both continuous indicia depth measurement logs shown in FIGS. 3 and 4.

Figure 10:
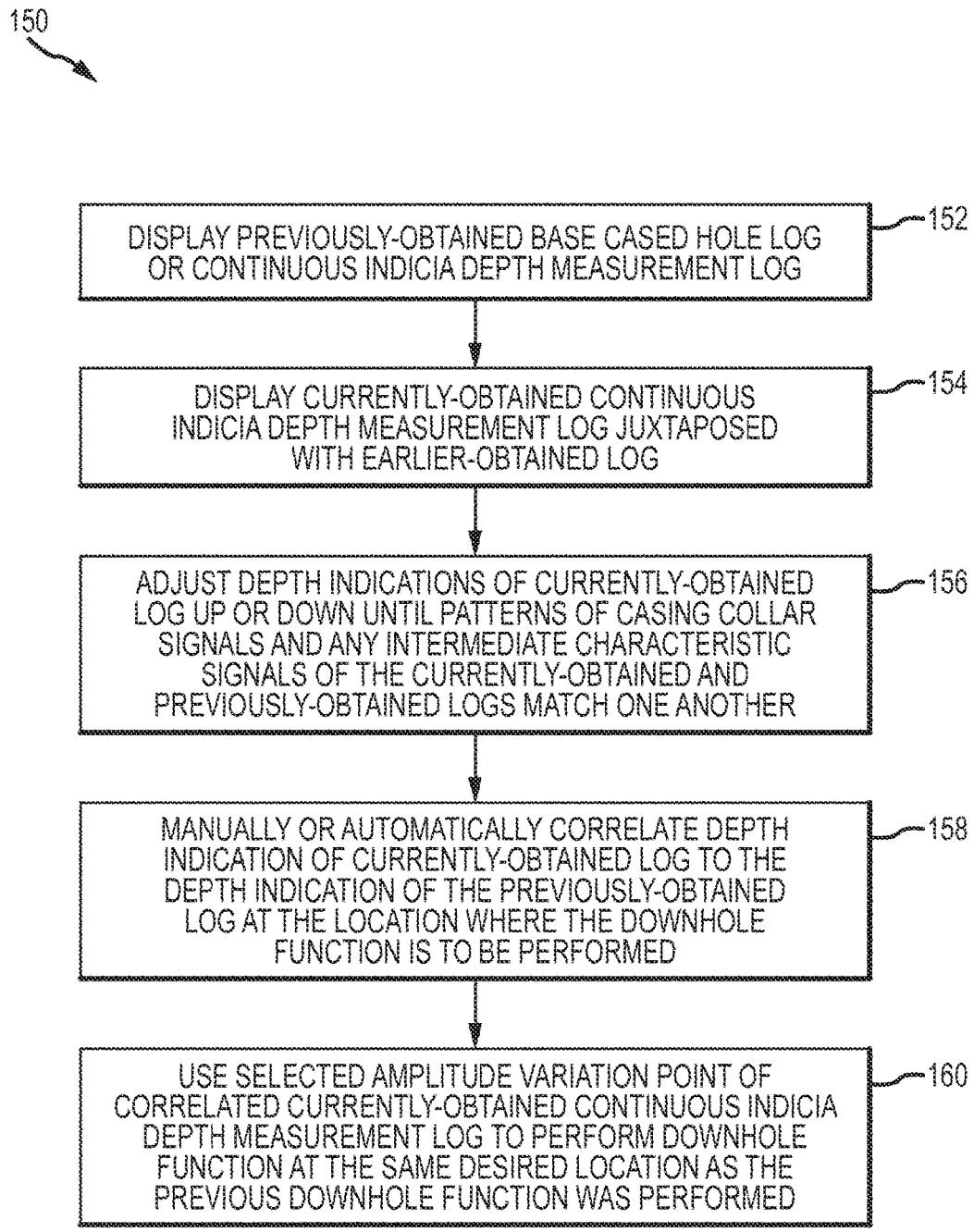

FIG. 10 is a flowchart of a process flow for adjusting the depth position of a currently-obtained well bore log relative to the depth position of a previously-obtained well bore log to thereby tie in or correlate the previous and current depth measurement logs.

DETAILED DESCRIPTION

The present invention involves establishing continuous, reliable, repeatable, precise and high resolution indicia of depth in a well bore 20 shown generally in FIG. 1. The invention involves generating continuous intermediate characteristic signals (70, FIGS. 3 and 4) resulting from sensing the innate, persistent, unaltered magnetic or other characteristic properties along the length of pipe segments 22 which have been connected together at casing collars 24 to form a liner or casing 26 of the well bore 20. When coupled with conventional casing collar signals (58, FIGS. 3 and 4) which indicate the location of the casing collars 24, the intermediate characteristic signals obtained at spaced apart intervals from between adjacent casing collars 24 constitute continuous, high-resolution indicia of the length of each pipe segment 22 and therefore the depth within the well bore 20.

The high resolution depth indicia is used to accurately position a downhole tool 28 at one or more precise locations within the well bore 20 between the casing collars 24, to enable conducting downhole functions or activities at each precise locations. A gravity survey is an example of one such downhole function. Furthermore, the high resolution depth indicia between the casing collars 24 allows the downhole tool to be positioned and the downhole function to be performed at precisely the same depths in the well bore 20 after a significant lapse of time. Achieving the same repeatable position after a time lapse is necessary to accurately perform many downhole functions, such as accurate gravity surveys.

The innate, persistent and unaltered characteristics of the pipe segments 22 which form the well bore casing 26, and equipment used in order to practice the invention, are described in FIGS. 1 and 2, in connection with the details of the present invention.

The casing 26 is formed by connecting multiple pipe segments 22 in an end-to-end manner at the casing collars 24, as shown in FIG. 2. One casing collar 24 is formed on one end of each pipe segment 22. The casing collar 24 has an internal connector to attach the end of the adjacent pipe segment 22, for example by threading the end of the adjacent pipe segment into the internally threaded casing collar 24. To accommodate such a connection, each casing collar 24 typically has an enlarged diameter compared to the remaining portion of each pipe segment 22.

The well bore casing 26 is formed by connecting each pipe segment 22 at the casing collar 24 of the previous pipe segment 22 and lowering the sequentially-connected pipe segments 22 into a borehole 30 drilled into a geological formation of the earth 32 as each pipe segment 22 is connected, as understood from FIGS. 1 and 2. The borehole 30 extends into the geological formation 32 from a surface 34 of the earth. Once lowered into the desired position, the casing 26 is cemented into a stationary position in the borehole 30 relative to the geological formation 32.

Typically, the well bore 20 and the casing 26 extend into a reservoir 36 of hydrocarbon products such as a oil or gas. The hydrocarbons are extracted through the casing 26. However, for other uses of the present invention, the well bore 20 may extend adjacent to a subterranean structure 38 of the geological formation 32 with respect to which a survey or other downhole functions is conducted.

A well bore survey or other downhole function is conducted by lowering the downhole tool 28 to the desired depth in the well bore 20. The downhole tool 28 is suspended in the well bore 20 from a cable 40, typically called a "wireline." The wireline 40 consists of a mechanical load-bearing cable and other signal-communicating conductors (neither specifically shown). The load-bearing cable has sufficient strength to support the weight of the downhole tool 28. The signal-communicating conductors supply power to components of the downhole tool 28 and communicate control and information signals between sensors and other components of the downhole tool 28 and control and data recording devices 42 located at the surface 34.

Signals from the control devices 42 establish the desired functionality of the components of the downhole tool 28. Sensors of the downhole tool 28 derive the signals which contain information detected from within the well bore 20. Signals from sensors are conducted through the signal-communicating conductors of the wireline 40 to the recording devices 42, where that information is recorded. The signals conducted between the downhole tool 28 and the control and data recording devices 42 over the wireline 40 are typically referred to as "telemetry."

The upper portion of the wireline 40 is wrapped around a motorized winch or spool 44. The downhole tool 28 is connected to a lower end of the wireline 40. The motorized spool 44 is typically located within a truck 46. The spool 44 rotates in one direction to pay out or extend the wireline 40 into the well bore 20 and rotates in the other direction to take up or withdraw the wireline 40 from the well bore 20, thereby lowering and raising the downhole tool 28 in the well bore 20, respectively. The wireline 40 extends from the truck 46 and bends around an alignment pulley 48. The alignment pulley 48 directs the wireline 40 from the spool 44 into the upper end of the well bore 20. The alignment pulley 48 is suspended from a support or tower 50. The downhole tool 28 moves in the well bore 40 in relation to the rotation of the motorized spool 44, assuming that there is no cable stretch or that movement of the downhole tool 28 is impeded by an obstruction or restriction in the well bore 20.

An encoder or odometer 52 is positioned to contact the wireline 40 at the surface 34 and indicate the length of the wireline 40 extending from the surface 34 to the downhole tool 28. The short distance between the odometer 52 and the earth surface 34, and the distance from the point where the lower end of the wireline 40 connects to the downhole tool 28 to the specific sensors and functional components within the downhole tool 28 is taken into account in establishing the tare of the odometer 52. The depth measurement indicated by the odometer 52 is therefore the length, amount or distance of wireline 40 that is payed out into the well bore 20. Signals from the odometer 52, which represent this indicated cable length measurement, are communicated to the data recording equipment 42.

Although the depth of the downhole tool 28 is typically indicated by the length of cable extended into the well bore, as measured by the odometer 52, such measurements are subject to errors caused by the cable stretching between the odometer 52 and the downhole tool 28. The amount of cable stretch is a complicated function which is dependent on the previously-mentioned factors, among other things. Because of these error-inducing factors, the tool depth measured by the odometer 52 cannot be relied upon for precise positioning. Consequently, those types of downhole tools 28 which require accurate positioning include a conventional casing collar locator 54 to derive casing collar signals at the location of each casing collar 24.

The casing collar locator 54 emits magnetic flux which flows through the casing 26 adjacent to the casing collar locator 54 as the downhole tool 28 moves within the casing 26. A sensor of the casing collar locator 54 senses the strength of the magnetic field as the flux is conducted through the casing 26 and supplies an output signal 56 very which has a magnitude related to the strength of the sensed magnetic field. The output signal 56 is plotted or recorded by the data recording devices 42 relative to depth measurement indicated by the odometer 52, as understood from FIGS. 2-4.

The magnitude or strength of the output signal 56 from the casing collar locator 54 is directly related to the magnetic permeability of the material, typically steel, of each pipe segment 22 through which the magnetic flux is conducted. With the threaded end of the adjacent pipe segment 22 connected into the internally threaded casing collar 24, as shown in FIG. 3, the thickness of material at the casing collar location is greater than wall thickness of the adjacent portions of the pipe segments 22. This greater thickness of material creates greater magnetic permeability, and that increased magnetic permeability generates a significant change in the magnitude of the output signal 56 when the casing collar locator 54 moves past the casing collar 24. Furthermore, there may be a slight gap where the end of the adjacent pipe segment 22 does not fully abut an internal shoulder of the casing collar 24. This gap, if it exists, also contributes to a change in magnetic permeability which also influences the magnitude of the output signal 56 as the casing collar locator 54 moves past the casing collar 24.

The increased magnetic permeability at the casing collars 24 causes a significant and momentary change in magnitude of the output signal 56 as the casing collar locator 56 moves past the casing collar 24, as understood from FIGS. 2-4. The change in magnitude of the output signal 56 constitutes a casing collar signal 58. In the usual circumstance, the magnitude of the output signal 56 undergoes two significant changes as the casing collar locator 54 moves past each casing collar 24; one significant change in magnitude occurs when the casing collar locator 54 first encounters the edge of the increased thickness of the casing collar 24, and the other significant change in magnitude occurs when the casing collar locator 54 moves past the other opposite edge of the casing collar where the thickness decreases to the normal wall thickness of the pipe segment 22. These changes in magnitude cause the casing collar signal 58 to clearly identify the location of the casing collar 24 at a depth indicated by the odometer 52 (FIG. 1).

The magnitude of the casing collar signal 58 is correlated and plotted relative to the indicated intervals 60 of the depth measurement supplied by the odometer 52. The plot of the casing collar signal 58 on a chart relative to the odometer-indicated depth measurement intervals 60 is typically referred to as a casing collar location log. After the casing has been cemented into the borehole 30, a casing collar location log is obtained by moving a downhole tool containing a casing collar locator 54 (FIG. 1) along the length of the casing and recording the casing collar signals 58 relative to the odometer-indicated depth.

By use of the casing collar log and knowing the length of each pipe segment, and by use of natural gamma ray logs conducted before and after the casing 26 is installed in the borehole 30, a base cased hole log is created. The base cased hole log shows the depth positions of the casing collars 24. All subsequent downhole functions and activities conducted at selected depths in the well bore 20 are governed by the base cased hole log. Each subsequent depth measurement must be correlated or "tied in" to the depth measurement indications of the base cased hole log.

In addition to the casing collar locator 54 shown in FIG. 1, the downhole tool 28 also includes appropriate types of conventional sensing devices for obtaining the desired downhole information and/or conventional functional tools to perform desired downhole functions. For example, to conduct a gravity survey of the well bore 20, the survey tool 28 includes an appropriate gravity measuring instrument 62, such as a gravimeter to measure the magnitude of gravity at predetermined locations within the well bore 20 or a gradiometer to measure a differential in gravity at predetermined locations within the well bore 20.

The downhole tool 28 may optionally include, for example, a gamma ray detector 64 to obtain a natural gamma ray log information emitted from the geological formation 32. The natural gamma ray log is obtained by moving a downhole tool containing the gamma ray detector 64 along the length of the casing and recording the strength of natural radiation signals relative to the odometer-indicated depth. The natural radiation information from a gamma ray log also helps correlate each subsequent measured depth position relative to the gamma ray information contained in the base cased hole log.

The present invention involves deriving a continuous indicia depth measurement log 68, as shown in exemplary form in FIG. 4. The continuous indicia depth measurement log 68 includes the casing collar signals 58 plotted relative to the measurement depth intervals 60 supplied by the odometer 58, just as in a conventional casing collar location log. However, the invention additionally involves obtaining and using intermediate characteristic signals 70 contained in the output signal 56 of the casing collar locator 54 (FIG. 1) between the casing collar signals 58. Traditionally, the intermediate characteristic signals 70 have not been regarded as useful and consequently were not typically recorded as a part of a conventional casing collar location log, or if the intermediate characteristic signals 70 were recorded, they were ignored as noise.

Of course, the signals between casing collars that are recorded and used to locate and identify intentionally introduced physical alterations in a pipe segment 22 between casing collars 24, create significant changes in magnitude of the output signal 56 somewhat similar to the casing collar signals 58. The signals from those intentional physical alternations are an important and recognized part of the base cased hole log. The signals from such intentional physical alterations to the casing 26 identify the location of holes which perforate the casing 26 to communicate with oil or gas in a surrounding reservoir, or to identify a defect which may have inadvertently developed in the casing 26, for example. Such intentionally introduced physical alterations are readily identified by the change in magnetic permeability of the pipe segment and are readily identifiable on the base cased hole log.

It has been discovered that the intermediate characteristic signals 70 between the casing collar locations collar signals 58 represent unique variations in permeability of the characteristic properties of each pipe segment, and that the lengthwise distribution of these variations in permeability, as sensed by the intermediate characteristic signals 70 along the length of each pipe segment 22, are capable of being used as high resolution measurement indicia by which to establish precise locations along each pipe segment 22 between the casing collars 24 (FIG. 1). Instead of being limited to accurate depth references only at the casing collar locations, as was the case with the base cased hole log or a previous casing collar location log, the present invention provides a continuous indicia of length and depth references along the entire length of each pipe segment 22. When coupled with casing collar location information which separately identifies each pipe segment 22 of the casing 26 (FIG. 1), the intermediate characteristic signals 70 constitute continuous high resolution measurement indicia along the entire length of the well bore casing 26. The intermediate characteristic signals 70 typically provide precise measurement location information with a resolution of 1-2 cm.

It has further been discovered that the characteristic properties of the pipe segments 22 which create the intermediate characteristic signals 70 persist over time. The properties of the pipe segments 22 include unique variations in the magnetic permeability along their length, and those unique variations in magnetic permeability persist and do not change significantly over time. Even normal degradation of the pipe segments due to rusting from water in the geological formation 32 or wear from objects moving within the casing 26, do not erase or significantly alter the unique characteristic properties of each pipe segment to the point of preventing the intermediate characteristic signals 70 from being obtained after a significant time lapse from when the same unique pattern of unique intermediate characteristic signals 70 was earlier obtained. The pattern of the intermediate characteristic signals 70 defines high resolution measurement indicia which permits downhole functions to be performed at precisely the same location, within 1-2 cm of the previous location, and also permits such downhole functions to be performed at precisely the same location after a considerable and significant lapse of time has occurred, while still achieving the accuracy resulting from establishing the same downhole depth position.

The use of the intermediate characteristic signals 70 as high resolution downhole measurement indicia is shown in FIG. 4. The intermediate characteristic signals 70 have characteristic variations in amplitude at points 72 caused by the unique, innate, persistent and unaltered variations in the magnetic permeability of the pipe segment along its length. The innate, persistent and unaltered variations in the magnetic permeability of the pipe segments distinguishes the intermediate characteristic signals 70 from signals created by intentionally introduced physical alterations of the pipe segments 22 between the casing collars 24.

Each amplitude variation point 72 of the intermediate characteristic signals 70 occurs at a different length position along each pipe segment. The amplitude variations points 72 are typically not uniform in spacing along the length of the pipe segment 22, although enough of the amplitude variation points 72 typically occur along the length of each pipe segment to obtain 1 or 2 cm resolution in a depth or length measurement. The intermediate characteristic signals 70 taken as a whole represent an accurate indicia depth or length measurement of each pipe segment.

Precise downhole positioning is obtained by identifying the particular amplitude variation point 72 between the casing collar signals 58, and positioning the downhole tool 28 (FIG. 1) by use of and in relation to a selected amplitude variation point 72. Real-time precise positioning is available by the real-time supply of signals from the casing collar locator 54 of the downhole tool 28 (FIG. 1).

Precise measurement indicia or intervals along the length of each pipe segment 22 is obtained by dividing the length of each pipe segment 26, for example 30 or 40 feet, into equal divisions (82, FIG. 4) along the intervals 60 of depth measurement information on the continuous indicia depth measurement log 68. The location of the casing collars is reliably established by the collar signals 58. With the equal divisions established in this manner, the amplitude variation point 72 which is the most closely aligned with the desired depth interval is selected as the point to move the downhole tool 28.

To obtain the intermediate characteristic signals 70 with the detectable amplitude variation points 72, the casing collar locator 54 must be sensitive enough to sense the changes caused by the characteristically-small, innate, persistent and unaltered magnetic permeability changes in the pipe segments 22. The casing collar locator 54 should also sample data at a higher rate than normal, for example at 5 mm to 1 cm intervals. To achieve this sample rate, the speed of moving the casing collar locator 54 along the casing 26 of the well bore 20 (FIG. 1) will typically be somewhat slower than usual. The sampling must be performed at high amplitude resolution in order to obtain signals with detectable amplitude variation points 72. Filtering the output signal from the casing collar locator 54 must be short enough to not obscure the amplitude variation points 72 in the intermediate characteristic signals 70.

To establish the intermediate characteristic signals 70 in the best linear relationship with the indicated depth measurement from the odometer 50, the problems associated with cable stretch of the wireline 40 must be avoided or minimized when collecting and recording the intermediate characteristic signals 70, as understood by reference to FIG. 1. The traditional way to avoid or minimize the anomalies associated with cable stretch involve moving the downhole tool 28 downward in the well bore 20 to a position at least 50 or 100 feet below the zone of interest. The zone of interest includes one or more pipe segments 22 where it is desired to record the intermediate characteristic signals 70 for use in performing a survey or downhole functions. Upon reaching the position below the zone of interest, the wireline 40 is withdrawn from the well bore 20 at a constant rate to move the downhole tool 28 upward completely through the zone of interest in an uninterrupted continuous movement at the constant rate. The constant rate of upward movement of the downhole tool 28 through the initial 50 to 100 feet before reaching the zone of interest allows most of the cable stretch anomalies dissipate, so that the depth information recorded by the odometer 52 becomes more reliable.

The most erroneous depth measurements from the odometer 52 result after the downhole tool 28 has been stopped in movement within the well bore 20 and then movement is restarted. It is the stopping and starting that allows the cable stretch anomalies to have the greatest adverse effect on accurate depth measurements from the odometer 52. Moving the downhole tool 28 upward at a constant rate from a sufficient distance below the zone of interest to allow the cable stretch anomalies to dissipate, without stopping and starting the movement of the downhole tool 28, avoids many of the depth measurement errors from the odometer 52. The depth information recorded on the continuous indicia depth measurement log 68 is preferably obtained without stopping and starting the downhole tool, and in this manner the depth information establishes a better and more reliable correlation of the intermediate characteristic signals 70 to the actual depth within the zone of interest.

It is not possible to fully eliminate all of the anomalies which affect the depth measurements from the odometer 52, although many of the significant errors are eliminated moving the downhole tool 28 at a constant rate without stopping through the zone of interest after allowing enough movement before encountering the zone of interest to dissipate the cable stretch and certain other anomalies. Enhanced accuracy is obtained by obtaining multiple continuous indicia depth measurement logs 68, and then averaging the information obtained from each of those logs into a single continuous indicia depth measurement log 68.

Averaging multiple individual continuous indicia depth measurement logs 68 to create the single averaged continuous indicia depth measurement log 68 has the effect of canceling or minimizing individual errors that may have occurred while obtaining an individual continuous indicia depth measurement log. This averaging also establishes more accurate locations of the amplitude variation points 72 relative to the depth information. Of course, the casing collar signals 58 are also available to assist in such averaging on a pipe segment-by-pipe segment basis.

A process flow 74 for obtaining precise depth indicia between each casing collar by using the intermediate characteristic signals 70 of the continuous indicia depth measurement log 68 (FIG. 4), is shown in FIG. 5. The process flow 74 applies only to a single pipe segment 22, although that process flow 74 may be repeated for each pipe segment 22 within the zone of interest or along the entire casing.

The process flow 74 begins as shown at 76 by first obtaining the continuous indicia depth measurement log 68 (FIG. 4). The continuous indicia depth measurement log is obtained as previously described. Next, as shown at 78, the length of one pipe segment 26 in the zone of interest in the continuous indicia depth measurement log 68 is identified as extending between adjacent between casing collar signals 58. The length of the identified pipe segment is then divided at 80 into a number of length or depth division markers 82 (FIG. 4). Preferably the division markers 82 are equal in length and occur on a more finely spaced basis than the more widely spaced intervals of depth measurement 60. Each of the division markers 82 represent an increment of length or depth along the selected pipe segment. Since the length of the pipe segment is known, for example 30 or 40 feet, the division markers 82 linearly correlate to the length of the pipe segment as length measurement indicia, as shown at 84.

A desired location along the length of the pipe segment is referenced by selecting a division marker 82 which most closely approximates the desired location, as shown at 86. Next, as shown at 88, an amplitude variation point 72 of the intermediate characteristic signal 70 (FIG. 4) is selected which most closely approximates to the desired position referenced by the selected division marker. The selected amplitude variation point 72 thereafter becomes the indicia of the desired location along the length of the pipe segment. In this manner, the amplitude variation points 72 serve to reference the division markers 82 along the length of the pipe segment (FIG. 4), which in turn reference desired positions along the length of the pipe segment. The actions shown at 76-88 in FIG. 5 thereby describe a process of using the intermediate characteristic signals 72 (FIG. 4) as measurement indicia by which to establish precise length or depth positions along each pipe segment.

FIG. 5 also illustrates using the amplitude variation point 72 (FIG. 4) selected as shown at 88 to perform a downhole function, such as a gravity survey. The downhole tool 28 (FIG. 1) is moved relative to the selected amplitude variation point 72 (FIG. 4), as shown at 90. Since the output signal 56 from the casing collar locator 54 (FIGS. 1, 3 and 4) is preferably supplied in real time for display and use at the control and data recording devices 42 on the earth surface 34, the length of the wireline 40 is paid out or retracted as necessary to precisely position the downhole tool 28 at the location identified by the real time-supplied selected amplitude variation point 72 (FIG. 4) of the real-time supplied intermediate characteristic signals. Adjustments in the position of the downhole tool 28 may be made without concern about cable stretch anomalies, because the real-time intermediate characteristic signal 70 contains the amplitude variation point selected as shown at 88 and becomes the reference by which to move the downhole tool, not the indication from the odometer 52 (FIG. 1). By using the intermediate characteristic signal 70 and the selected amplitude variation point 72, rather than a depth indication from the odometer 52, the downhole tool is precisely positioned at the desired location, typically within a range of accuracy of 1-2 cm of the desired location. The downhole function is performed at this location, as shown at 92.

Use of the present invention to perform different types of downhole functions at very precise locations within the well bore 20 on an initial or a repeat basis after a significant time lapse has occurred is discussed in connection with FIGS. 6-9. One particular use of the invention is to perform a gravity survey where it is necessary that the gravity measurements be taken at the same predetermined locations within the well bore. Similarly, the present invention also benefits the performance of other types of downhole functions, such perforating the casing 26 at the exact desired location in a reservoir 36 (FIG. 1), and performing certain maintenance and other downhole functions at predetermined locations to enhance or maintain production from the well.

A process flow 94 for correlating or "tying in" the continuous indicia depth measurement log 68 (FIG. 4) to the pre-existing base cased hole log for an existing well bore, in order to thereafter used the continuous indicia depth measurement log 68 for precise downhole positioning at the locations indicated by the base cased hole log, is shown in FIG. 6. The process flow 94 begins as shown at 96 by obtaining the continuous indicia depth measurement log 68 in the manner previously described. In conjunction with obtaining the continuous indicia depth measurement log 68, another natural gamma ray log may be optionally obtained as shown at 98. The subsequent gamma ray log obtained 98 is useful, but may not be necessary in all instances, to correlate the depth indicia of the continuous indicia depth measurement log with the depth indicia of the pre-existing base cased hole log. It may be sufficient to rely only on the casing collar locations signals 58 for the correlation without using gamma ray depth information. However, because the base cased hole log also includes and was derived in part from natural gamma ray information obtained before and immediately after the casing 26 was installed in the well bore 20 (FIG. 1), the natural gamma ray information may aid in performing this correlation.

Next, as shown at 100, the continuous indicia depth measurement log 68 is correlated or tied in to the base cased hole log. The tie-in occurs by adjusting the recorded depth position of the continuous indicia depth measurement log 68 until the casing collar signals 58 of both the continuous indicia depth measurement log and the base cased hole log align with one another. The natural gamma ray information obtained at 98 may also be used in establishing this alignment. More details concerning the process of tying in or correlating a presently obtained log, such as the continuous indicia measurement log, with a pre-existing or previously-obtained log, such as the base cased hole log, are described below in conjunction with FIG. 10.

Tying the logs together as shown at 100 is not necessarily to obtain precise depth measurements, but to cross reference the more precise depth information from the continuous indicia depth measurement log 68 to the base cased hole log.

Since the base cased hole log is the master document which governs the position of all downhole activities in the particular well bore, it is important to continue to use the base cased hole log as the same reference for all future downhole activities. Of course, on a new well, a continuous indicia depth measurement log 68 (FIGS. 3 and 4) might be used from the beginning of the existence of the cased well bore as the base cased hole log, but that circumstances not illustrated in FIG. 6.

Next, as shown at 102, the desired downhole location where a particular downhole function is to be performed is cross referenced from the base cased hole log to the continuous indicia depth measurement log. After the continuous indicia depth measurement log has been tied into the base cased hole log, the position of any previous downhole activity is referenced to the selected amplitude variation point 72 of the intermediate characteristic signals 70 (FIG. 4), as described above. Thereafter the downhole tool is moved in the well bore to a position referenced by the selected maximum amplitude point 72 (FIG. 4), as shown at 104, and the downhole function is thereafter performed at that location, as shown at 106.

A process 108 for performing a downhole function at a desired downhole location after a significant time lapse from when a previous downhole function was performed at the same downhole location by reference to the base cased hole log, is illustrated in FIG. 7. The previous performance of the downhole function at the desired downhole location using the base cased hole log is shown at 110. A significant lapse of time after the first downhole function was performed until it is desired to perform the next subsequent downhole function is shown at 112.

A continuous indicia depth measurement log 68 (FIGS. 3 and 4) is obtained, as shown at 114. A natural gamma ray log is also optionally obtained for use with the continuous indicia depth measurement log, as shown at 116. The continuous indicia depth measurement log 68 is tied to or correlated to the base cased hole log, as shown at 118. The downhole location of the previously performed downhole function is cross referenced from the base cased hole log to a selected amplitude variation point 72 of the intermediate characteristic signals 70 of the tied-in continuous indicia depth measurement log 68 (FIG. 4), as shown at 120. The downhole tool is moved to the desired location referenced by the selected amplitude variation point 72, as shown at 122, and the downhole function is performed at the desired downhole location as shown at 124 by reference to the amplitude variation point selected at 120. The activities shown at 114-124 and described above in connection with FIG. 7 are similar to as those activities shown at 96-106 and described in FIG. 6, except that FIG. 6 does not specifically involve a previously performed downhole function at the same location.

A process 126 for performing a downhole function at a desired downhole location after a significant lapse of time from when a downhole function was previously performed at that same location is shown in FIG. 8, under circumstances when the previous downhole function was performed in reference to a previously obtained and used continuous indicia depth measurement log 68 (FIG. 4). Because the previous downhole function was performed at a desired location referenced by a selected amplitude variation point 72 of the intermediate characteristic signals 70 of the previously obtained continuous indicia depth measurement log 68 (FIG. 4), the next downhole function is performed as shown in FIG. 8 by using the previously obtained continuous indicia depth measurement log as shown at 128.

Since the innate unaltered characteristics of the pipe segments 22 of the casing 26 of the well bore 20 persist for long periods of time, typically longer than the useable lifetime of the well bore 20 (FIG. 1), those persistent characteristics cause the intermediate characteristic signals 70 and the amplitude variation points 72 to be reproducible and comparable to those same signals and points of a previously-obtained continuous indicia depth measurement log. Consequently, the intermediate characteristic signals 70 and amplitude variation points 72 obtained subsequently directly correlate to the comparable signals and points of the previous continuous indicia depth measurement log. Because of the direct correlation of comparable signals, there is no need to tie in or correlate a subsequently-obtained continuous indicia depth measurement log with any previously-obtained continuous indicia depth measurement log. Instead, the previously-obtained continuous indicia depth measurement log may be used directly for downhole positioning purposes, as shown at 128.

The intermediate characteristic signals 72 obtained while moving the downhole tool to perform the subsequent downhole function occur in real time and are directly correlated to the previously-obtained casing collar location, thereby permitting movement of the downhole tool to the desired location indicated by the pre-existing continuous indicia depth measurement log, as shown at 130. Thereafter, the downhole function is performed at the desired location, as shown at 132.

The process flow 126 illustrates the advantageous use of the intermediate characteristic signals resulting from the innate, persistent and unaltered characteristics of the pipe segment to reduce the amount of time required to position the downhole tool at a precise location, when a previously-obtained continuous indicia depth measurement log exists for the well bore. The continuous real-time output signals 56 (FIGS. 3 and 4) from the casing collar locator 54 allow the downhole tool 28 (FIG. 1) to be moved directly to the desired location indicated by the previously-obtained continuous indicia depth measurement log 68, thereby saving the time and effort required to obtain a current continuous indicia depth measurement log.

In some circumstances, it may be necessary or desirable to obtain a second continuous indicia depth measurement log 68 (FIG. 4) for a well bore before performing a downhole function, even though a previous continuous indicia depth measurement log for that well exists. This situation is illustrated by a process flow 134 shown in FIG. 9.

Generally speaking the process flow 134 occurs after a previous downhole function was performed at a desired location referenced to the earlier obtained continuous indicia depth measurement log, as shown at 136. The subsequent downhole function will be performed after a significant lapse of time has occurred, as shown at 138. A second continuous indicia depth measurement log is obtained, as shown at 140, after the substantial lapse in time. The later-obtained continuous indicia depth measurement log 68 is tied in to the earlier-obtained continuous indicia depth measurement log 68, as shown at 142. The tie-in or correlation shown at 142 may generally be accomplished by reference to the casing collar signals 58 and the intermediate characteristic signals 70 (FIG. 4), using the techniques described below in connection with FIG. 10. In general terms, because the information contained in the earlier-obtained and later-obtained continuous indicia depth measurement logs offers more resolution than a natural gamma ray log, there is usually no need to collect natural gamma ray information to accomplish this tie-in. However, the natural gamma ray log information could also be used in making the tie-in, if desired.

The downhole location at which the downhole function is to be performed has been identified by an amplitude variation point 72 of the previously-obtained continuous indicia depth measurement log. However, because the subsequent downhole activity is performed with respect to the later-obtained continuous indicia depth measurement log, as shown at 140, the amplitude variation point 72 of the previously-obtained continuous indicia depth measurement log 68 is cross referenced to a corresponding amplitude variation point 72 of the later-obtained continuous indicia depth measurement log 68, as shown at 144. Thereafter the downhole tool is moved to the desired location identified by the amplitude variation point 72 of the later-obtained continuous indicia depth measurement log 68 (FIG. 4), as shown at 146, and the downhole function is performed, as shown at 148. The location of the subsequent performed downhole function is the same as the location of the previously performed downhole function, due to the correlation between the earlier-obtained and later-obtained continuous indicia depth measurement logs.

The technique for tying in or correlating an earlier-obtained well bore log, such as the base cased hole log, with a subsequently-obtained or currently-obtained well bore log, such as the continuous indicia depth measurement log 68 (FIG. 4), is illustrated by a process flow 150 shown in FIG. 10. The process flow 150 is preferably performed by use of the computer-controlled display control and equipment 42 (FIG. 1), and may occur in real time at the well site. Alternatively, the currently-obtained or subsequently-obtained information can be obtained at the well site and the process flow 150 can thereafter be executed at a later time.

The process 150 begins as shown at 152 by displaying a previously-obtained well bore log, such as the base cased hole log or a previously-obtained continuous indicia depth measurement log. The display preferably occurs on an electronic display device 42 (FIG. 1), although the display could be presented physically with printed logs.

As shown in 154, a currently-obtained well bore log is displayed. For example, the currently-obtained well bore log may be a currently-obtained or very recently-obtained continuous indicia depth measurement log 68 (FIG. 4). The display of the currently-obtained log, as shown at 154, occurs side-by-side or juxtaposed with the display of the previously-obtained log, as shown at 152. Both logs displayed at 154 should have comparable amplitudes and have the same depth scale reference.

Next, as shown at 156, the depth position of the currently-obtained log is adjusted up or down relative to the depth position of the previously-obtained log until the patterns of casing collar signals 58 and any intermediate characteristic signals 70 (FIG. 4) match with the patterns of those same signals from the previously-obtained log. If the previously-obtained and currently-obtained logs do not include any intermediate characteristic signals 70 (FIG. 4), or if only one of the previously-obtained or currently-obtained logs includes intermediate characteristic signals 70 (FIG. 4), the matching shown at 156 occurs by focusing principally on the casing collar signals 58 (FIGS. 3 and 4).

Once the signals of the previously-obtained and currently-obtained logs have been matched, as shown at 156, the depth indication of the currently-obtained log is adjusted to correspond to the depth indication of the previously-obtained log, as shown at 158. The adjustment in the depth indication is accomplished by an operator manually incrementing the depth indication offset of the currently-obtained log until it coincides or matches with the depth indication of the previously-obtained log, as shown at 156.

The adjustment in depth indication offset may also be accomplished automatically by an automatic correlation function involved in a computer system of the control and data recording devices 42 (FIG. 1). To accomplish automatic correlation, an analysis of the signals of the previously-obtained and currently-obtained logs is performed by numerical and/or graphical analysis routines executed by the computer and the results of such analyses are used to automatically adjust the depth indication offset of the currently-obtained log so that it corresponds or matches as nearly as possible to the depth indication indications of the previously-obtained log, as shown at 158. Such automatic correlation functionality is available from conventional software programs used for signal and waveform correlation analysis.

Lastly as shown at 160, a downhole function is performed at the same desired location as the previous downhole function was performed by using the correlated depth information of the matched currently-obtained log to select the desired location. The desired downhole location is preferably identified by reference to an amplitude variation point 72 of the intermediate characteristic signals 70 of the continuous indicia depth measurement log 68 (FIG. 4), if one of the previously-obtained or the currently-obtained logs is a continuous indicia depth measurement log.

The present invention may be used to particular advantage in conducting a gravity survey of the well bore. A meaningful gravity survey of a well bore requires the gravity measurement instrument 62 of the downhole tool 28 (FIG. 1) to be located within 1 or 2 cm of each of the depth positions where the same gravity measurements from a previous gravity survey of the well bore were conducted. Otherwise, the accuracy of the gravity survey may suffer and the survey may not be reliable. The present invention provides the technique for locating the gravity measurement instruments within 1 or 2 cm of a previous location. No other known downhole depth measurement system or technique is capable of such precision, insofar as is now known. The present invention greatly improves the performance and reliability of downhole gravity surveys.

Furthermore, because of the potential for more quickly positioning the downhole tool in the desired locations within close tolerances of the previous locations, the cost of performing downhole gravity surveys is significantly reduced. For example, it is not uncommon that the gravity measurements must be obtained in as many as 50 different positions within a well bore in a single gravity survey. Moving directly to each of these positions, without requiring the extra time and movement and measurement practices necessary to eliminate the undesirable effect of cable stretch, greatly reduces the amount of time required to obtain those gravity measurements. As a result, considerably less time is required to perform the survey itself. More importantly however, the well must be removed from production for a shorter amount of time. The reduced time of suspended production allows the profitable production of hydrocarbons from the well to resume more quickly. Similar other important advantages and improvements in conducting other types of a well bore surveys and downhole functions also occur.

There are many other advantages and improvements in the capability of using the innate, persistent and unaltered characteristics of the pipe segments to develop fine-resolution indicia of distance between casing collar locations in a well bore, as well as repeatedly positioning downhole tools at the same locations to perform downhole functions after a significant time lapse. Although the innate characteristics of the pipe segments which provide the unique intermediate characteristic signals 70 (FIG. 4) are described above as magnetic permeability characteristics of each pipe segment 22, other similar material or sensed characteristic properties may also prove satisfactory for establishing intermediate characteristic signals which constitute the fine-resolution indicia of the length of each pipe segment.

The significance of the above-described and other improvements and advantages will become apparent upon gaining a full appreciation of the invention. Preferred embodiments of the invention and many of its improvements have been described with a degree of particularity. The detail of the description is of preferred examples of implementing the invention. The detail of the description is not necessarily intended to limit the scope of the invention. The scope of the invention is defined by the following claims.

The invention claimed:

1. A method of deriving measurement indicia between casing collars of at least one pipe segment of a casing in a well bore, comprising:
    obtaining intermediate characteristic signals along the length of the pipe segment between the casing collars by sensing variations in innate, persistent and unaltered characteristic properties of the one pipe segment existing continuously along its length between the casing collars;
    distinguishing the intermediate characteristic signals from other signals created by intentionally introduced physical alterations in the pipe segment between the casing collars; and
    using the intermediate characteristic signals as indicia of the length of the one pipe segment between the casing collars.

2. A method as defined in claim 1, further comprising:
    dividing the length of the one pipe segment into divisions; and
    correlating the intermediate characteristic signals to the divisions.

3. A method as defined in claim 1, used to position a downhole tool at a desired location between the casing collars of the one pipe segment, further comprising:
    selecting a predetermined aspect of the intermediate characteristic signals which corresponds to the desired location; and
    moving the downhole tool to the desired location by reference to the predetermined aspect of the intermediate characteristic signals.

4. A method as defined in claim 3, further comprising:
    moving the downhole tool while sensing the variations in the characteristic properties of the one pipe segment to obtain the intermediate characteristic signals which include the predetermined aspect.

5. A method as defined in claim 3, used to perform a downhole function at the desired location, further comprising:
    moving the downhole tool to the desired location using the predetermined aspect of the intermediate characteristic signals; and
    performing the downhole function with the downhole tool at the desired location by reference to the predetermined aspect of the intermediate characteristic signals.

6. A method as defined in claim 5, wherein the intermediate characteristic signals include amplitude variations occurring along the length of the one pipe segment and the predetermined aspect constitutes a selected amplitude variation of the intermediate characteristic signals.

7. A method as defined in claim 5, wherein:
the variations in the characteristic properties are variations in the magnetic permeability of the one pipe segment.

8. A method as defined in claim 3, wherein:
the variations in the characteristic properties are variations in the magnetic permeability of the one pipe segment.

9. A method as defined in claim 1, used with a base cased hole log that establishes locations within the casing including a desired location along the one pipe segment between the casing collars, further comprising:
correlating a predetermined aspect of the intermediate characteristic signals to the desired location described in the base cased hole log.

10. A method as defined in claim 9, further comprising:
creating a continuous indicia depth measurement log from the intermediate characteristic signals obtained along the length of the one pipe segment between the casing collars; and
correlating predetermined aspects of the intermediate characteristic signals of the continuous indicia depth measurement log to depth locations of the base cased hole log along the length of the one pipe segment.

11. A method as defined in claim 10, further comprising:
correlating at least one predetermined aspect of the intermediate characteristic signals of the continuous indicia depth measurement log to the desired location described by the base cased hole log at which one of a downhole tool is to be positioned or a downhole function is to be performed.

12. A method as defined in claim 11, wherein:
the variations in the characteristic properties are variations the magnetic permeability of the one pipe segment.

13. A method as defined in claim 9, wherein:
the variations in the characteristic properties are variations in the magnetic permeability of the one pipe segment.

14. A method as defined in claim 10, wherein:
the variations in the characteristic properties are variations in the magnetic permeability of the one pipe segment.

15. A method as defined in claim 14, further comprising:
using a computer executing software instructions to automatically correlate the depth locations of the base cased hole log and the intermediate characteristic signals of the continuous indicia depth measurement log.

16. A method as defined in claim 1, used to perform a downhole function at a desired location in the casing which is described by a previously-existing base cased hole log, further comprising:
correlating a predetermined aspect of the intermediate characteristic signals to the desired location described in the base cased hole log.

17. A method as defined in claim 16, wherein:
the variations in the characteristic properties are variations in the magnetic permeability of the one pipe segment.

18. A method as defined in claim 1, wherein the casing is described by a base cased hole log that establishes locations along the casing including a desired location between the casing collars of the one pipe segment, further comprising:
performing a first downhole function at the desired location by reference to the base cased hole log;
waiting for a predetermined time to lapse after performing the first downhole function;
obtaining the intermediate characteristic signals after the time lapse;
correlating a predetermined aspect of the intermediate characteristic signals to the desired location in the base cased hole log; and
performing a second downhole function after the time lapse at the same location where the first downhole function was performed by reference to the predetermined aspect of the intermediate characteristic signals.

19. A method as defined in claim 18, further comprising:
creating a continuous indicia depth measurement log from the intermediate characteristic signals; and
performing subsequent downhole functions at the same desired location where the first and second downhole functions were performed by reference to the predetermined aspect of the intermediate characteristic signals of the continuous indicia depth measurement log.

20. A method as defined in claim 18, further comprising:
performing the first downhole function as a plurality of first gravity measurements at a corresponding plurality of the desired locations which are spaced apart along the length of the one pipe segment;
identifying each of the plurality of the desired locations of the first gravity measurements by respectively different predetermined aspects of the intermediate characteristic signals obtained after the time lapse; and
performing the second downhole function as a plurality of second gravity measurements at the plurality of the desired locations by reference to the respective predetermined aspects of the intermediate characteristic signals obtained after the time lapse.

21. A method as defined in claim 20, wherein:
the variations in the characteristic properties are variations in the magnetic permeability of the one pipe segment.

22. A method as defined in claim 18, wherein:
the variations in the characteristic properties are variations in the magnetic permeability of the one pipe segment.

23. A method as defined in claim 1, used to perform first and second downhole functions at the same desired location, further comprising:
obtaining a first set of intermediate characteristic signals;
performing a first downhole function within the one pipe segment at a desired location identified by a predetermined aspect of the first set of intermediate characteristic signals;
waiting for a predetermined time to lapse after performing the first downhole function;
obtaining a second set of intermediate characteristic signals after the time lapse, the first set of intermediate characteristic signals constituting earlier-obtained intermediate characteristic signals and the second set of intermediate characteristic signals constituting later-obtained intermediate characteristic signals;
identifying the predetermined aspect of the later-obtained intermediate characteristic signals which correlates to the predetermined aspect of the earlier-obtained intermediate signals; and
performing the second downhole function at the same desired location as the first downhole function by reference to the predetermined aspect of the later-obtained intermediate characteristic signals.

24. A method as defined in claim 23, further comprising:
creating a continuous indicia depth measurement log from the earlier-obtained intermediate characteristic signals; and
moving a downhole tool and performing the second downhole function with the downhole tool at the desired location by reference to the predetermined aspect of the intermediate characteristic signals of the continuous indicia depth measurement log.

25. A method as defined in claim 23, further comprising:
creating a first continuous indicia depth measurement log from the earlier-obtained intermediate characteristic signals;
creating a second continuous indicia depth measurement log from the later-obtained intermediate characteristic signals; and
correlating the first and second continuous indicia depth measurement logs.

26. A method as defined in claim 25, further comprising:
using the predetermined aspect of the first continuous indicia depth measurement log to perform the first downhole function at the desired location; and
using the correlated predetermined aspect of the second continuous indicia depth measurement log to perform the second downhole function at the same desired location where the first downhole function was performed.

27. A method as defined in claim 25, further comprising:
using a computer executing software instructions to automatically correlate corresponding predetermined aspects of the first and second continuous indicia depth measurement logs.

28. A method as defined in claim 25, wherein:
the variations in the characteristic properties are variations in the magnetic permeability of the one pipe segment.

29. A method as defined in claim 23, further comprising:
performing the first downhole function as a plurality of first gravity measurements at a plurality of desired locations which are spaced apart along the length of the one pipe segment;
identifying each of the plurality of desired locations of the first gravity measurements by respectively different predetermined aspects of the earlier-obtained intermediate characteristic signals; and
performing the second downhole function as a plurality of second gravity measurements at a plurality of desired locations which are identical in position to the desired locations of the plurality of first gravity measurements by reference to corresponding predetermined aspects of the earlier-obtained and later-obtained intermediate characteristic signals.

30. A method as defined in claim 29, wherein:
the variations in the characteristic properties are variations in the magnetic permeability of the one pipe segment.

31. A method as defined in claim 23, wherein:
the variations in the characteristic properties are variations in the magnetic permeability of the one pipe segment.

32. A method as defined in claim 1, wherein:
the variations in the characteristic properties are variations in the magnetic permeability of the one pipe segment.

* * * * *